US00RE33978E

United States Patent [19]

Shirai

[11] E Patent Number: Re. 33,978

[45] Reissued Date of Patent: Jun. 30, 1992

[54] AIR-COOLED OVERHEAD-VALVE ENGINE

[75] Inventor: Tetsuaki Shirai, Kobe, Japan

[73] Assignee: Kawasaki Jukogyo Kabushiki Kaisha, Kobe, Japan

[21] Appl. No.: 692,900

[22] Filed: Apr. 29, 1991

Related U.S. Patent Documents

Reissue of:

[64] Patent No.: 4,672,922
Issued: Jun. 16, 1987
Appl. No.: 838,578
Filed: Mar. 11, 1986

[30] Foreign Application Priority Data

Mar. 13, 1985 [JP] Japan ..... 60-51332

[51] Int. Cl.[5] ..... F01P 1/02

[52] U.S. Cl. ..... 123/41.66; 123/41.7

[58] Field of Search ..... 123/41.56, 41.58, 41.65, 123/41.66, 41.69, 41.7

[56] References Cited

U.S. PATENT DOCUMENTS

| | | | |
|---|---|---|---|
| 1,491,361 | 4/1924 | Reddig | 123/41.66 |
| 1,644,719 | 10/1927 | Fliedner | 123/41.66 |
| 2,758,580 | 8/1956 | Balzer | 123/41.65 |
| 4,438,733 | 3/1984 | Sasaki | 123/41.65 |

*Primary Examiner*—Noah P. Kamen
*Attorney, Agent, or Firm*—Marshall, O'Toole, Gerstein, Murray & Bicknell

[57] ABSTRACT

An air-cooled overhead-valve engine comprises a cooling fan connecting to one end portion of crankshaft and surrounding with fan casing, a combustion air intake port provided in the direction of downstream side of cooling air, and push rods for driving a cam arranged in opposite side to said intake port with relate to a center of cylinder. The engine can be used suitable to power lawn mowers and the like.

8 Claims, 4 Drawing Sheets

AIR-COOLED OVERHEAD-VALVE ENGINE

Matter enclosed in heavy brackets [ ] appears in the original patent but forms no part of this reissue specification; matter printed in italics indicates the additions made by reissue.

BACKGROUND OF THE INVENTION (1) Field of the Invention:

The present invention relates to an air-cooled overhead-valve engine suitable to power lawn mowers and the like.

(2) Description of the Prior Art:

Generally, said engine has been broadly adopted to a structure as shown in FIG. 1. As shown in the FIG. 1, a cooling fan 2 mounted to one end portion of crankshaft 1 is received within a fan casing 3. Said fan casing 3 is extended from the vicinity of crankcase 5 to the vicinity of cylinder block 6 and cylinder head 7. Furthermore, the fan casing 3 is provided with a suction air opening formed coaxially with the crankshaft 1 and an exit section opened towards to the cylinder block 6 and the cylinder head 7, respectively. Also, the fan casing 3 is provided with an [intake] *inlet* port 8 for combustion air at the vicinity of the cylinder head 7, and said [intake] *inlet* port 8 is connected to a carburetor 10 through an air cleaner 9. The [intake] *inlet* port 8 is provided *upstream* in the direction of air flow f formed by the cooling fan 2, and in details, the [intake] *inlet* port 8 is provided in a position, which is difficult to form a flow drift of air flow f.

In the construction in the prior art as shown in the above, the [intake] *inlet* port 8 is located at a position of low velocity head, thereby a fuel flow control in the carburetor 10 will be obtained easily, and a suction air to the fan casing 3 and an inflow of dust to the [intake] *inlet* port 8 will be inhibited. However, in such prior construction, a cam gear 12 for driving intake and exhaust valves 11, push rods 13 and a rocker arm 14, respectively are arranged on the same side with an intake port 16 with relationship to a cylinder center 0-0 (center line, which is extended in the moving direction of piston 15) as shown in FIG. 2, while an exhaust port 26 is arranged in the opposite side of the intake port 16. Thus, in the arrangement of the cam gear 12 constructed as shown in the above, generally, the cooling fan 2 [refers to] *is* a centrifuged fan, so that the fan casing 3 is necessary to form it in volute state. In this case, preferably, the engine can be formed compactly by providing the cam gear 12 on a side of a large volute radius of the fan casing 3, but many following disadvantages produce in the configuration of the engine:

That is, in the construction as discussed thereinabove, an [inlet] *intake* pipe 17 is formed to the intake port 16, said *intake* pipe 17 is provided [with a space in] between both push rods 13 as shown by solid line in FIG. 3, or is located in roundabout route as shown by two-dot-line. In either case, it is allowed to complicate the construction. Also, since the intake port 16 is provided [with a space in] between both push rods 13, a cooling air passage 39 surrounded with a wall 35 of combustion chamber 20, a valve guide boss 36, *and* a rocker arm chamber [and a push rod-through portion 38, respectively] *37* would be intercepted by the [inlet] *intake* pipe 17, which is defined the intake port 16 and as a result, it is incapable of a substantial flow of cooling air for the cooling of such cylinder head 7 as a most heated surface of the engine. Also, the intake port 16 is provided in such a manner that the intake port 16 is located to make a deviated route from the push rod 13 as shown by the two-dot-line, so that the [inlet] *intake* pipe 17 is necessary to exchange it to an alternative part instead of the integrated cylinder head 7. So alternative is the impact of elevating considerably a manufacturing cost. Also, the intake port 16 extends to long, giving reduction to an intake efficiency of the engine.

Also, in a vertical shaft engine having vertically supported crankshaft, the carburetor 10 is mounted upon a relatively high level, while the air cleaner 9 and fuel tank (not shown in Figure) are mounted upon relatively same level and as a result, the particular structural arrangement of engine is much less a compactness. In addition, the exhaust port 26 is located in the opposite side to the intake port 16, and a spark plug 25 allows approaching nearest to said exhaust port, giving rise high temperature condition, an insufficient cooling of the spark plug results too early ignition in a large negative work of the engine.

Also, Japanese patent application laid-open No. 59-70838 and Japanese utility model application publication No. 1081/84 include therein as references in the prior art.

SUMMARY OF THE INVENTION

It is an object of the invention to provide an air-cooled overhead-valve engine, which is improved a relative location relationship of the push rods and the intake ports and the like.

The invention is characterized in that a cooling fan is connected to one end portion of crankshaft, said fan is surrounded with a fan casing, which is extended from the vicinity of said crankcase to the vicinity of cylinder head, a combustion [air-intake] *air inlet* port is provided in the *fan casing adjacent the cylinder head and upstream in the* direction of [downstream of] cooling air, said [intake] *inlet* port is connected to a combustion chamber through an air cleaner, a carburetor and [the] *an* intake port, respectively, the cam driven push rods for driving the overhead-valves are arranged in the opposite side to said intake port with relation to center of cylinder, an exhaust valve and an exhaust port are located [in the direction of a downstream of cooling air f'] *downstream in the direction of cooling air from the intake valve and intake port*, said exhaust port is opened in the vertical direction to the intake port, and a spark plug is arranged between [a push rod for the intake valve and a push rod for the exhaust valve] *the valves and push rods.*

Other features and advantages of the invention will be move full understood and appreciated from the following description of specific embodiment taken together with the accompanying drawings.

BRIEF DESCRIPTION OF THE DRAWINGS

The invention will now be described in greater detail with reference to the drawings in which.

Figure 1:
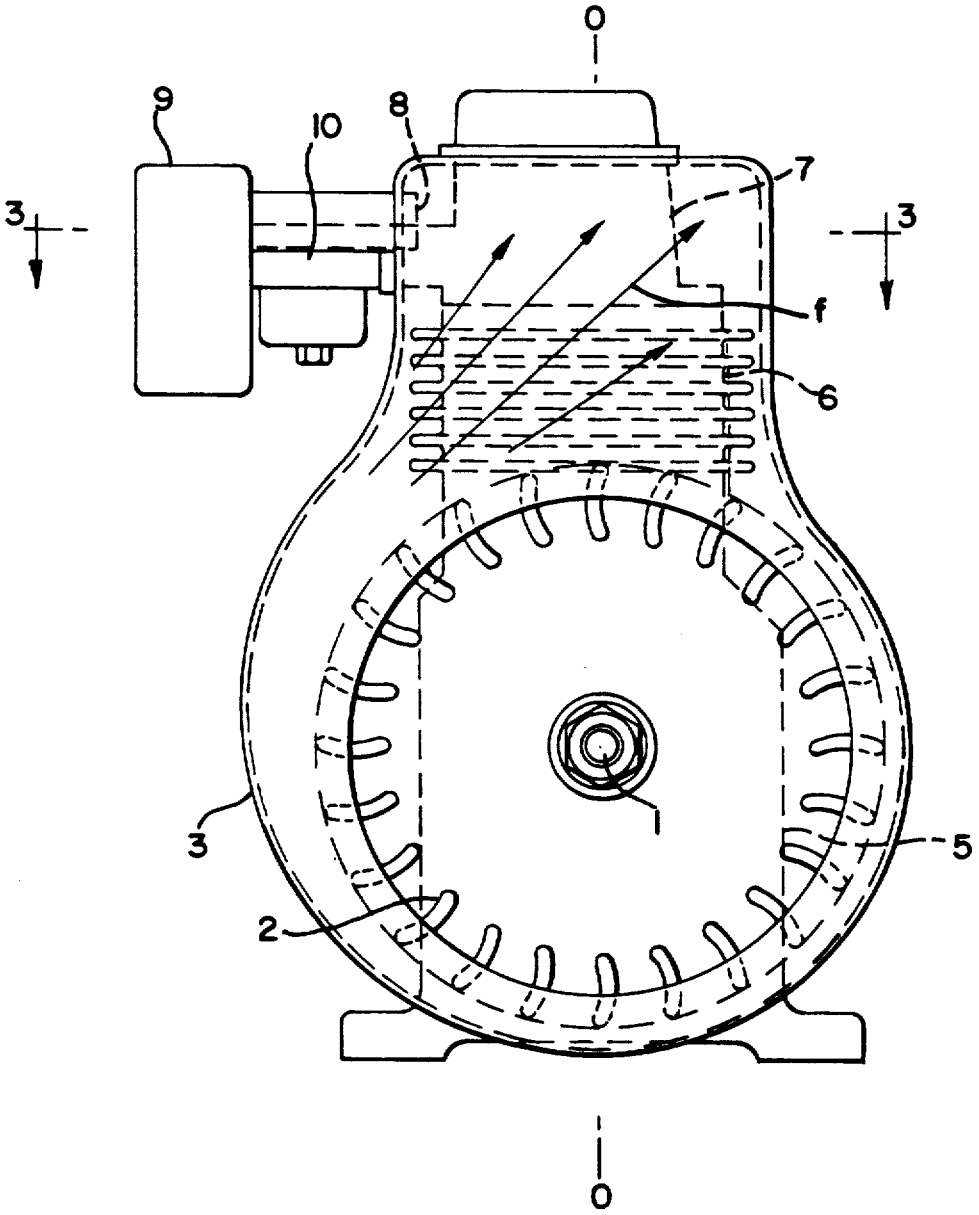
FIG. 1 PRIOR ART
FIG. 1 is a front plan view of the engine in the prior art.
Figure 2:
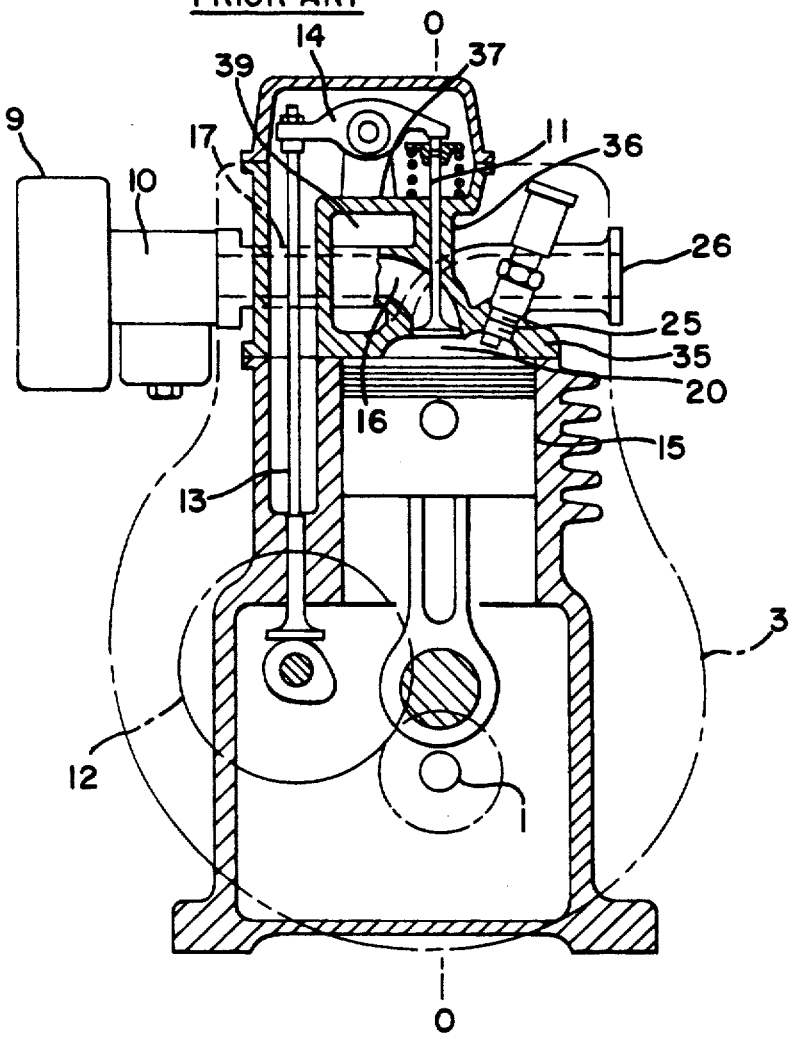
FIG. 2 PRIOR ART
FIG. 2 is a partially sectional view of the engine shown in FIG. 1.
Figure 3:
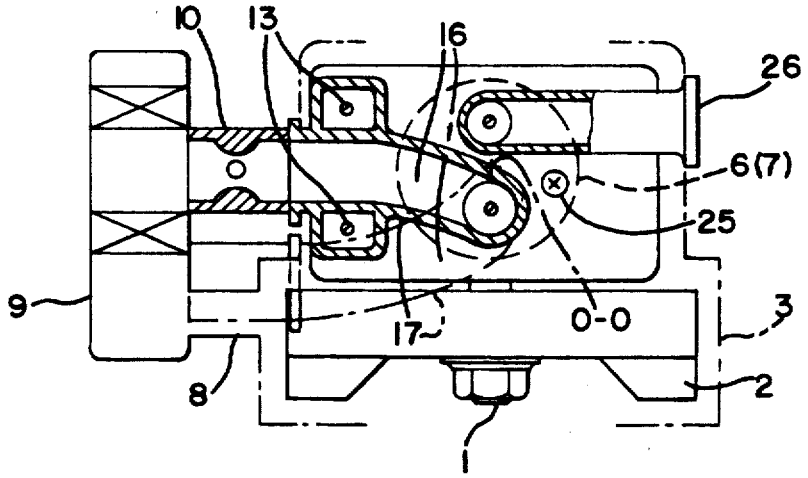
FIG. 3 PRIOR ART
FIG. 3 is a partially sectional view take on lines III—III of FIG. 1.
Figure 4:
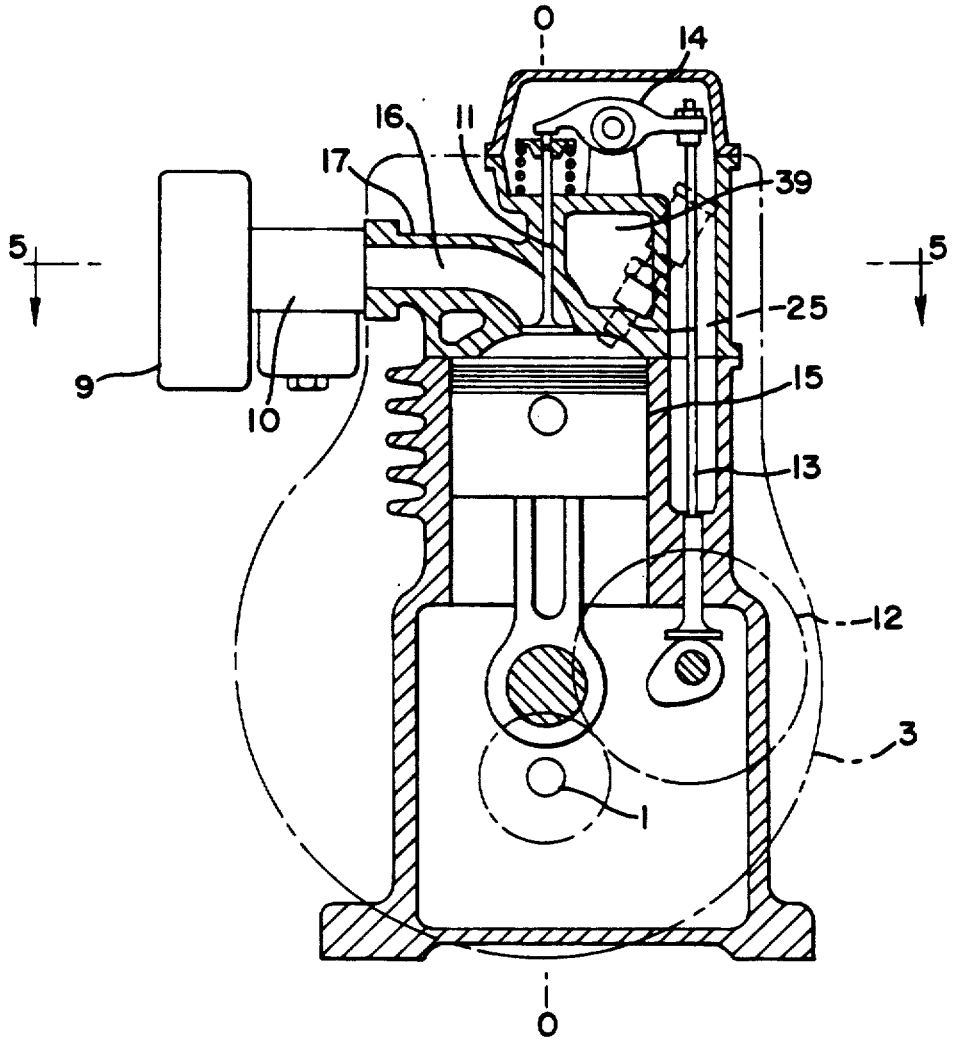
FIG. 4 is a sectional view of a basic example of the engine in accordance with the invention.
Figure 5:
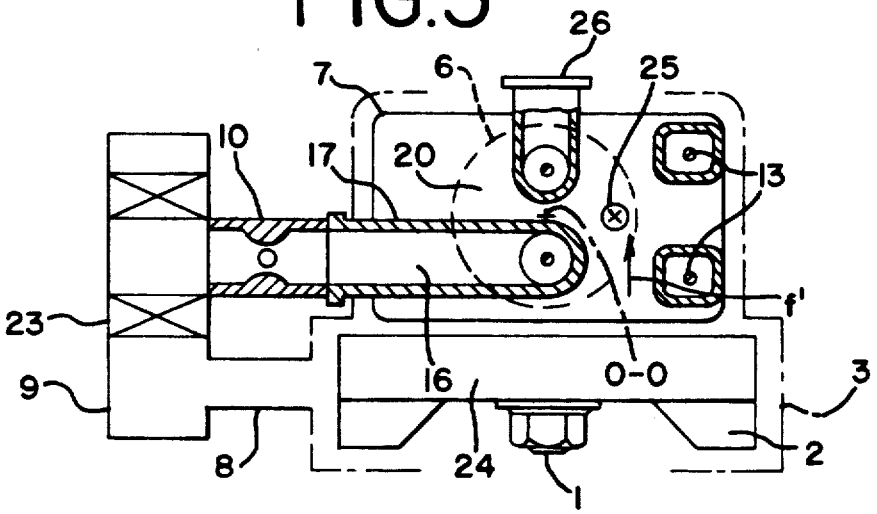
FIG. 5 is a partially sectional view take on lines V—V of FIG. 4.
Figure 6:
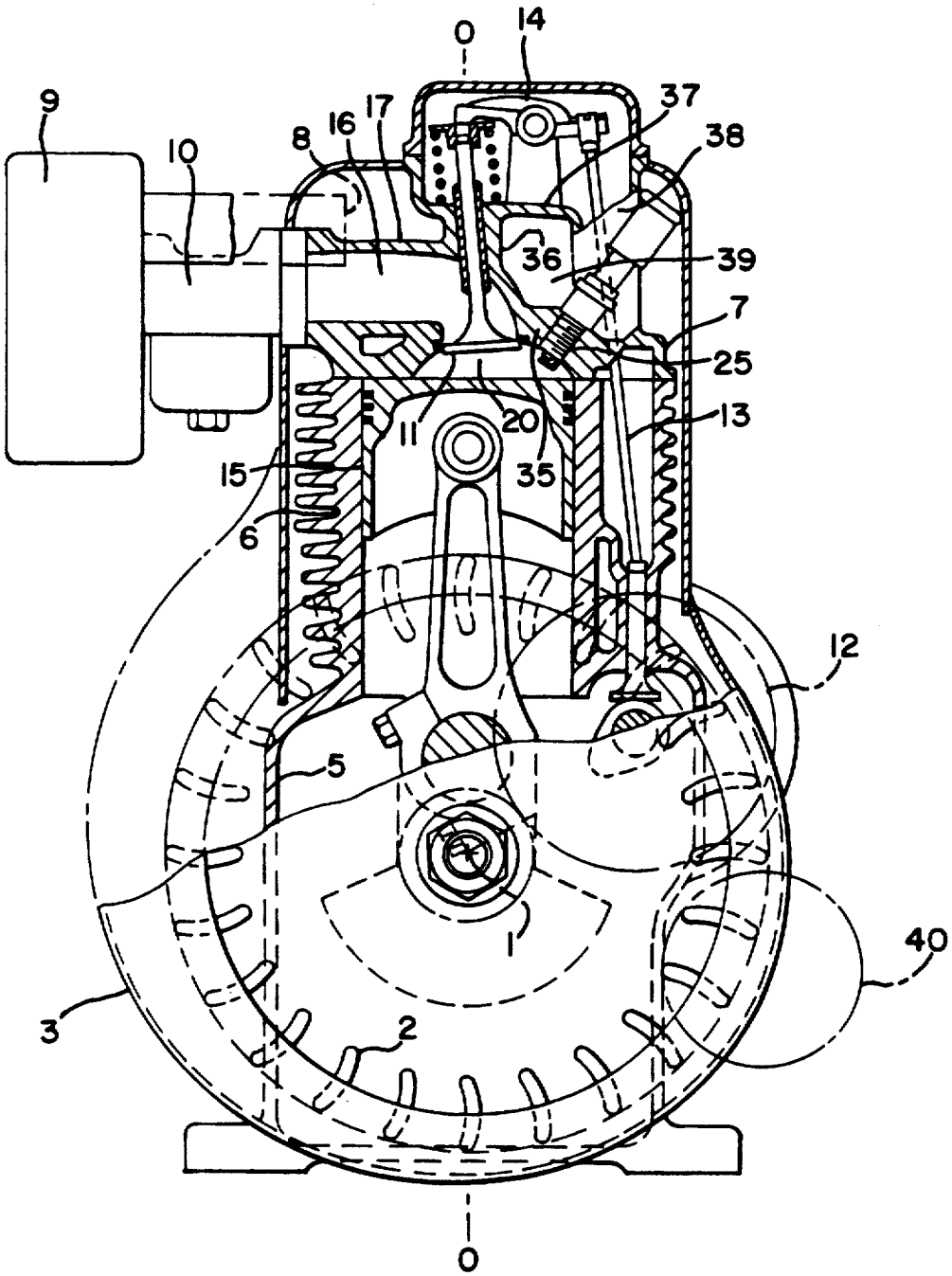
FIG. 6 is a detail view shown extensively the engine shown in FIG. 4.

The same component parts in FIGS. 4~6 are indicated with the use of the same sign as those in FIGS. 1~3, and the construction shown in FIGS. 4~6 according to the invention are explained as follows:

In FIG. 4, the cam gears 12 for driving the intake and exhaust valves 11, the push rods 13 and the rocker arm 14, respectively are arranged in the direction of opposite side to the intake port 16 with relationship to the cylinder center 0—0 (in the right side of FIG. 4). The [inlet]*intake* pipe 17, which is formed the intake port 16 is extended from the combustion chamber 20 to an internal part of the cylinder head 7 as shown in the left side of FIG. 5, and the extended end thereof is connected to the carburetor 10. Said carburator 10 is located sidewards the cylinder head 7 and at the substantial same level as that of the cylinder head 7 and further connected to the air cleaner 9. The air cleaner 9 is located [upwardly the carburetor 10 and] sidewards the fan casing 3 and connected to the [air-intake] *air inlet* port 8 of said fan casing 3. The exhaust port 26 is located [in the downstream *in the* direction of the cooling air f' and opened in the vertical direction to the intake port 16, so that a required distance of the exhaust port 26 to a spark plug 25 can be maintained, said spark plug 25 [providing] *being provided* between the [intake and exhaust] *valves 11 and the* push rods 13, and as a result, it can be improvable to a cooling performance of the spark plug 25.

Furthermore, the push rods 13 are arranged in the opposite side to the intake port 16 as indicated above, and the intake port 16 is not provided between both push rods 13, so that the intake port 16 can be arranged directly without making it the deviated route from both push rods 13. Also, as shown in FIG. 6, the [inlet] *intake* pipe 17 is formed integrally with the cylinder head body, so that the [inlet] *intake* pipe 17 can be connected directly to the carburetor 10. Thus, the configurative construction can be manufactured substantially in simple and in lower cost.

In addition, the intake port 16 can be formed without making a curve therein and can be formed shortly a length thereof, so that it can be elevated an intake effect of the engine.

Moreover, according to the invention, the cooling air passage 39 surrounded with the wall 35 of combustion chamber 20, the valve guide boss 36, the wall 37 of rock arm chamber and the push rod-through portion 38, respectively is not never intercepted by the [inlet] *intake* pipe 17, which is formed the intake port 16, thereby the hot surfaces of the spark plug 25 and the cylinder head 7 can be sufficiently cooled by cooling air.

A numeral 23 shows a filter element provided within the air cleaner 9, and a numeral 24 shows a fly-wheel. Also, a numeral 40 shows a starter motor. In any case, said starter motor 40 is arranged in the opposite side to the intake port 16 in such a manner that the cylinder center 0—0 is inserted between the starter motor 40 and the intake port 16. The starter motor 40 is also mounted to the crankcase 5.

In the operation of the engine, an external cooling air is supplied to the cylinder block 6 and the cylinder head 7 from the cooling fan 2. The combustion air is sucked into the carburetor 10 from the fan casing 3 through the [intake] *inlet* port 8 and air cleaner 9, respectively as shown in FIG. 5. Furthermore, the air fuel mixture is sucked into the combustion chamber 20 through the intake port 16 from the carburetor 10. In this operation, even if the [intake] *inlet* port 8 is located in the same location shown in FIG. 1, the dust and the like can not be sucked into the [intake] *inlet* port 8. In addition, a large dynamic pressure within the fan casing 3 due to cooling fan 2 can not be applied directly to the [intake] *inlet* port 8 and also a fuel flow can be easily controlled in the carburetor 10.

What is claimed is:

1. In an air-cooled overhead-valve internal combustion engine, said engine being composed of a crankcase with a crankshaft, a cylinder block with a cylinder head and a combustion chamber mounted in said crankcase, at least a pair of intake and exhaust valves installed in intake and exhaust ports formed in said cylinder head, a valve drive system mounted adjacent to said cylinder block for driving said intake and exhaust valves through cam-driven push rods, an intake pipe connected at one end thereof to said intake port and at its opposite end to an air cleaner and a carburetor, an exhaust duct connected at one end thereof to said exhaust port, a flywheel joined to said crankshaft at the other end of the output side end of said crankshaft and a cooling fan mounted on said flywheel, the improvements wherein said cooling fan is housed, together with said crankcase and flywheel, in a fan casing having a pair of inlet and outlet openings bored in opposite walls thereof, said inlet opening is located at the flywheel side of said crankshaft, while said outlet opening is located at the opposite side of said crankshaft from said flywheel, and said cam-driven push rods are located in said crankcase on that side of said cylinder block far remote from wherein said intake pipe is connected to said intake port, said cooling fan being mounted in said fan casing in such a manner that the cooling air from said cooling fan is allowed to flow in a direction substantially parallel with the axis of said crankshaft, along the surface of said cylinder block and cylinder head.

2. An engine as set forth in claim 1, wherein said intake port is located adjacent to that side of said cylinder block nearer said cooling fan and said intake pipe is laid substantially perpendicularly with the axis of said crankshaft while said exhaust port is located adjacent to that side of said cylinder block far remote from said cooling fan, the axis of said exhaust port extending substantially parallel with the axis of said crankshaft.

3. An engine as set forth in 2, wherein said inlet and exhaust ports are located in said cylinder block along said crankshaft, between said inlet and outlet openings of said fan casing that that said inlet and exhaust ports are directly exposed to the streams of cooling air from said cooling fan.

4. An engine as set forth in claim 1, wherein said inlet and exhaust ports are located in said cylinder block along said crankshaft, between said inlet and outlet openings of said fan casing so that said inlet and exhaust ports are directly exposed to the streams of cooling air from said cooling fan.

*5. In an air-cooled overhead-valve internal combustion engine, said engine being composed of a crankcase with a crankshaft, a cylinder block with a cylinder head and a combustion chamber mounted in said crankcase, at least a pair of intake and exhaust valves installed in intake and exhaust ports formed in said cylinder head, a valve drive system mounted adjacent to said cylinder block for driving*

*said intake and exhaust valves through cam-driven push rods, an intake pipe connected at one end thereof to said intake port and at its opposite end to an air cleaner and a carburetor, an exhaust pipe connected at one end thereof to said exhaust port, a flywheel joined to said crankshaft at the other end of the output side end of said crankshaft and a cooling fan mounted on said flywheel, the improvements wherein said cooling fan is housed, together with said crankcase and flywheel, in a fan casing having a pair of inlet and outlet openings bored in opposite walls thereof, said inlet opening is located at the flywheel side of said crankshaft, while said outlet opening is located at the opposite side of said crankshaft from said flywheel, and said cam-driven push rods are located in said crankcase on that side of said cylinder block far remote from where said intake pipe is connected to said intake port, said cooling fans being mounted in said fan casing in such a manner that the cooling air from said cooling fan is allowed to flow in a direction substantially parallel with the axis of said crankshaft, along the surface of said cylinder block and cylinder head, an air inlet port formed in said fan casing adjacent said cylinder head upstream with respect to the cooling air flow and at a position where the dynamic pressure due to said fan is low, said inlet port being connected to said air cleaner, and a spark plug mounted in said cylinder head in a space surrounded by said intake and exhaust ports and said push rods.*

*6. An engine as set forth in claim 5, wherein said intake port is located adjacent to that side of said cylinder block nearer said cooling fan and said intake pipe is laid substantially perpendicularly with the axis of said crankshaft while said exhaust port is located adjacent to that side of said cylinder block far remote from said cooling fan, the axis of said exhaust port extending substantially parallel with the axis of said crankshaft.*

*7. An engine as set forth in claim 6, wherein said intake and exhaust ports are located in said cylinder head along said crankshaft, between said inlet and outlet openings of said fan casing so that said intake and exhaust ports are directly exposed to the streams of cooling air from said cooling fan.*

*8. An engine as set forth in claim 5, wherein said intake and exhaust ports are located in said cylinder head along said crankshaft, between said intake and outlet openings of said fan casing so that said inlet and exhaust ports are directly exposed to the streams of cooling air from said cooling fan.*

* * * * *